(12) United States Patent
Lee

(10) Patent No.: US 9,146,153 B2
(45) Date of Patent: Sep. 29, 2015

(54) PHOTO SENSOR PACKAGE FOR LIGHTING

(71) Applicants: Hyun Young Lee, Daejeon (KR); Raytron Co., LTD, Daejeon (KR)

(72) Inventor: Hyun Young Lee, Daejeon (KR)

(73) Assignees: Hyun Young Lee, Daejeon (KR); RAYTRON CO., LTD, Daejeon (KR)

( * ) Notice: Subject to any disclaimer, the term of this patent is extended or adjusted under 35 U.S.C. 154(b) by 0 days.

(21) Appl. No.: 14/276,001

(22) Filed: May 13, 2014

(65) Prior Publication Data

US 2015/0054409 A1 Feb. 26, 2015

(30) Foreign Application Priority Data

Aug. 20, 2013 (KR) ................. 10-2013-0098697

(51) Int. Cl.
*H05B 37/02* (2006.01)
*G01J 1/02* (2006.01)

(52) U.S. Cl.
CPC ............. *G01J 1/02* (2013.01); *G01J 1/0214* (2013.01); *G01J 1/0271* (2013.01)

(58) Field of Classification Search
USPC .......... 315/149, 151, 291, 297, 307; 340/630; 257/82; 348/180; 250/201.1, 206, 250/578.1, 237
See application file for complete search history.

(56) References Cited

U.S. PATENT DOCUMENTS

| | | | |
|---|---|---|---|
| 2005/0057366 A1* | 3/2005 | Kadwell et al. | 340/630 |
| 2008/0116093 A1* | 5/2008 | Felten et al. | 206/316.2 |
| 2011/0044368 A1* | 2/2011 | Lee et al. | 372/50.21 |
| 2012/0086345 A1* | 4/2012 | Tran | 315/158 |

FOREIGN PATENT DOCUMENTS

KR    10-1243649 B1    3/2013

* cited by examiner

*Primary Examiner* — Douglas W Owens
*Assistant Examiner* — Syed M Kaiser
(74) *Attorney, Agent, or Firm* — Paratus Law Group, PLLC

(57) ABSTRACT

Disclosed is a photo sensor package for lighting, which is configured such that a micro control unit having a lighting control function as well as a timer function is integrated with a remote control element receiving a remote control signal of a lighting fixture. The photo sensor package includes a housing molded using infrared transmissible resin, a remote control element configured to receive an infrared signal, an amplification element configured to amplify a signal that is output from the remote control element, and a micro control unit configured to control a lighting fixture in response to a signal that is output from the amplification element. All of the remote control element, the amplification element, and the micro control unit are mounted on one lead frame and accommodated in the housing in such a way as to be integrated into a single structure.

5 Claims, 4 Drawing Sheets

PHOTO SENSOR PACKAGE FOR LIGHTING

CROSS REFERENCE TO PRIOR APPLICATIONS

The present application claims priority under 35 U.S.C. §119 to Korean Patent Application No. 10-2013-0098697 (filed on Aug. 20, 2013), which is hereby incorporated by reference in its entirety.

BACKGROUND OF THE INVENTION

1. Field of the Invention

The present invention relates to a photo sensor package for lighting, and, more particularly, to a photo sensor package for lighting, which is configured such that a micro control unit having a lighting control function as well as a timer function is integrated with a remote control element receiving a remote control signal of a lighting fixture.

2. Description of the Related Art

Recently, with economic development and the expansion of urbanization, many new construction projects aim to create modernized, high-rise, and large-sized buildings. Most building facilities are constructed to consume a relatively large amount of energy in view of convenient maintenance, an increase in the number of office machines and stability.

Thus, a lot of research is conducted into ways to reduce energy consumed in the buildings. For example, an air conditioning system, a power system, and a lighting system are separately constructed, and an energy management system is run based on the separately constructed systems.

Particularly, a lot of research on improvement in energy efficiency is conducted. For example, it includes performance diagnosis of air conditioning equipment, research on control and management technology, and analysis of consumption of energy supplied to buildings based on IT technology.

However, the existing research pertains to energy management efficiency for the same kind of equipment. There has not yet been developed a technology which simultaneously analyses and manages the energy consumption of the air conditioning system, the power system, and the lighting control system that are operated in a building, so as to maximize an energy saving effect.

Therefore, in the past, in order to satisfy several methods of controlling lighting systems in the building, for example, a group control method of simultaneously controlling individual lighting systems, a day and night control method, a control method depending on a position, or a control method depending on a time or season; there has been proposed a technology that controls all lights in the building by means of a network within the building. Particularly in the related art disclosed in Korean Patent No. 1243649, for example, there is described a lighting control apparatus and method, in which power used in one or more lighting devices installed in the building is checked and then is compared with power used to maintain brightness that does not cause inhabitants inconvenience, thus controlling the lighting devices based on the compared result and thereby achieving an energy saving effect.

In the past, there were proposed many technologies that remotely control a lighting fixture to provide convenience to a user.

As such, most of the technologies for lighting, which have been recently proposed, are intended to reduce power consumption and to provide convenience to a user. To this end, a remote controller for remotely controlling the lighting fixture and a lighting-fixture control device for setting the function of the lighting fixture are essentially required.

According to the related art, there are provided a remote control element that is installed within the lighting fixture to receive a remote control signal transmitted from the remote controller at a long distance, and a micro control unit that controls the lighting fixture.

Here, the remote control element receives the remote control signal using an infrared beam at a long distance, and then transmits the remote control signal to the micro control unit. Thus, the micro control unit performs control functions to turn on or off the lighting fixture in response to the remote control signal applied to the remote control element or to vary brightness.

However, the related art is problematic in that the remote control element and the micro control unit are separately manufactured and are installed within the lighting fixture, the latter having a limited area, so that two separate components should be installed in a narrow space.

Moreover, the related art is problematic in that the remote control element and the micro control unit are separately manufactured and installed, thus incurring high manufacturing cost, and in that two or more elements are assembled, so that it is impossible to install the elements in a small-sized lighting fixture such as a light bulb. Further, if the components are integrated with each other so as to solve the above-mentioned problem, the infrared beam received by the remote control element is incident on the micro control unit, thus undesirably generating a noise.

SUMMARY OF THE INVENTION

Accordingly, the present invention has been made keeping in mind the above problems occurring in the related art, and the present invention is intended to propose a photo sensor package for lighting, which is configured such that a remote control element and a micro control unit are integrated with each other, thus saving manufacturing cost and enhancing space utilization.

In order to achieve the above object, the following embodiments are provided.

There is provided a photo sensor package for lighting, including a housing molded using infrared transmissible resin; a remote control element configured to receive an infrared signal; an amplification element configured to amplify a signal that is output from the remote control element; and a micro control unit configured to control a lighting fixture in response to a signal that is output from the amplification element, wherein all of the remote control element, the amplification element, and the micro control unit are mounted on one lead frame and accommodated in the housing in such a way as to be integrated into a single structure.

The photo sensor package may further include disturbance-light shielding resin applied to an upper surface of the micro control unit to shield disturbance light.

The photo sensor package may further include a shield case configured to shield an upper portion and opposite sides of each of the micro control unit, the amplification element and the remote control element.

The shield case may include an upper plate extending to shield the upper portion of each of the micro control unit, the amplification element and the remote control element; a side plate extending downwards from each of opposite side edges of the upper plate; and a rear plate extending downwards from the upper plate to shield a rear of the remote control element. The rear plate may include a rear guide formed by cutting a predetermined portion of the rear plate to guide an infrared beam, which is incident through the housing, to the remote control element, and a protruding plate extending downwards from a lower end of the rear guide and bonded to the lead frame via conductive paste, the side plate may include a side guide formed by cutting a portion of the side plate, corresponding to each of the opposite sides of the remote control element, thus allowing the infrared beam to be incident on the remote control element, and the upper plate may include a shield window formed directly above the remote control element.

The shield case may further include a front plate extending downwards from a front edge of the upper plate to shield a front, and the front plate may include a cutout portion formed by cutting the front plate to define a space, and front protrusions provided on opposite sides of the cutout portion in such a way as to protrude downwards.

The micro control unit may set a time to turn on or off the lighting fixture, and may control the lighting fixture if a counted time reaches a preset time.

The micro control unit may be configured to control brightness of the lighting fixture.

As is apparent from the above description, the photo sensor package is advantageous in that the remote control element and the micro control unit can be integrated with each other to be installed within the lighting fixture, so that their installation is not restricted by the limited area of the lighting fixture, and in that the two devices are integrated into a single structure, so that it is possible to reduce the number of processes and working time, thus contributing to a reduction in manufacturing cost.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

Hereinbelow, a photo sensor package for lighting according to the preferred embodiment of the present invention will be described in detail with reference to the accompanying drawings.

Figure 1:
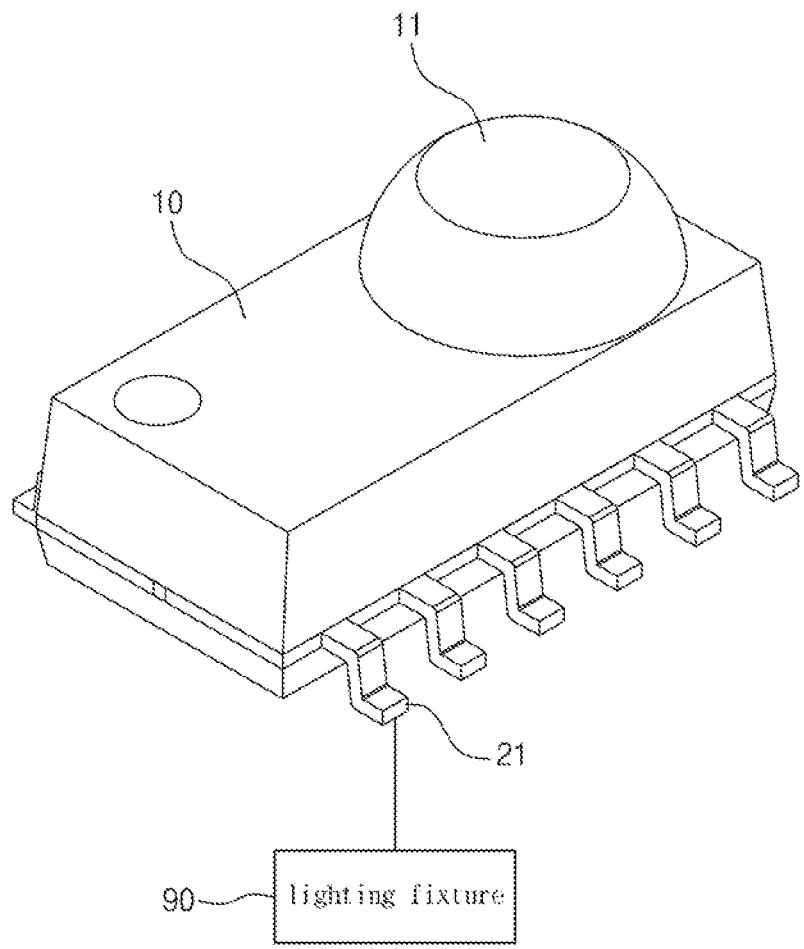
FIG. 1 is a perspective view showing a photo sensor package for lighting according to the present invention.
Figure 2:
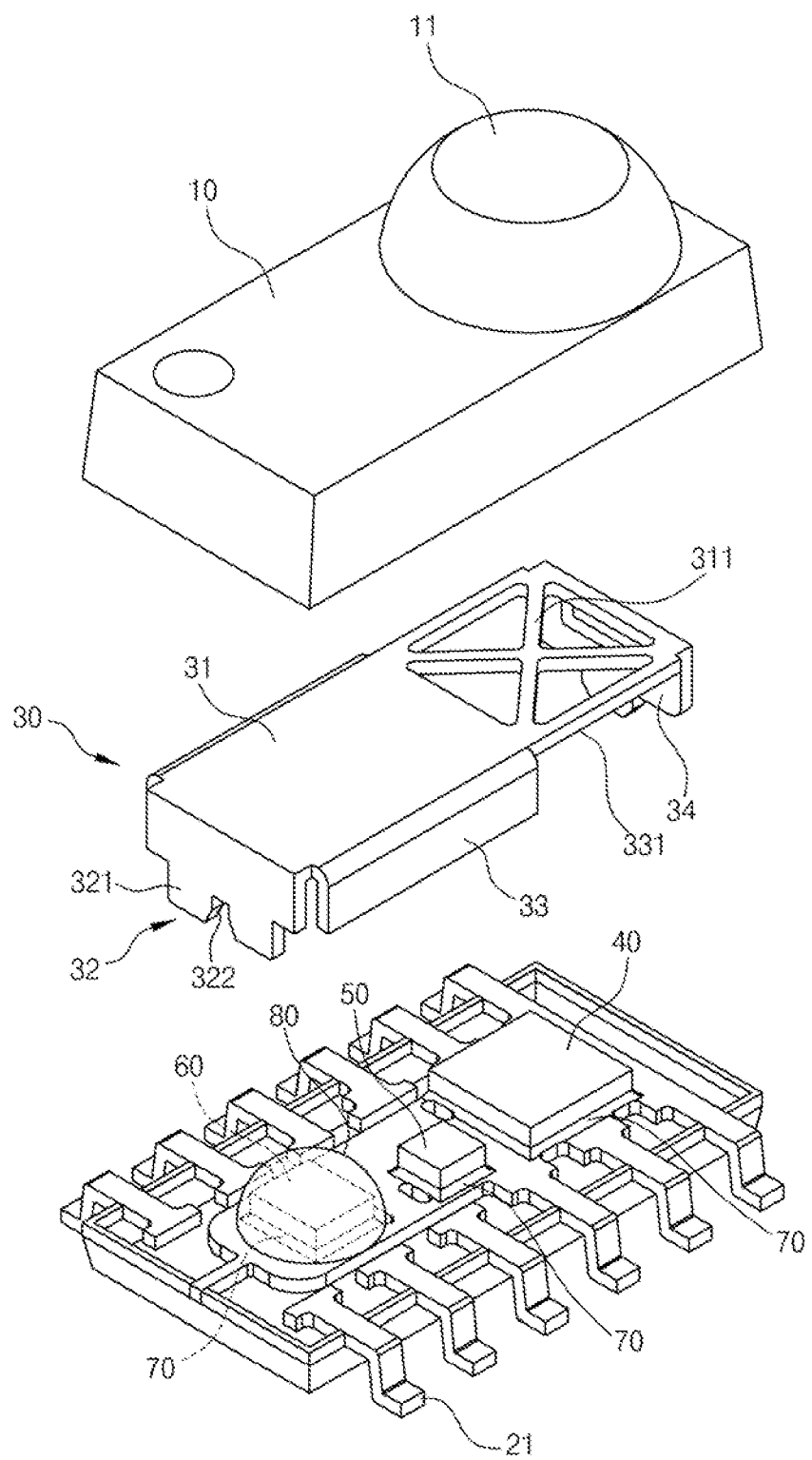
FIG. 2 is an exploded perspective view showing the photo sensor package for lighting according to the present invention.
Figure 3:
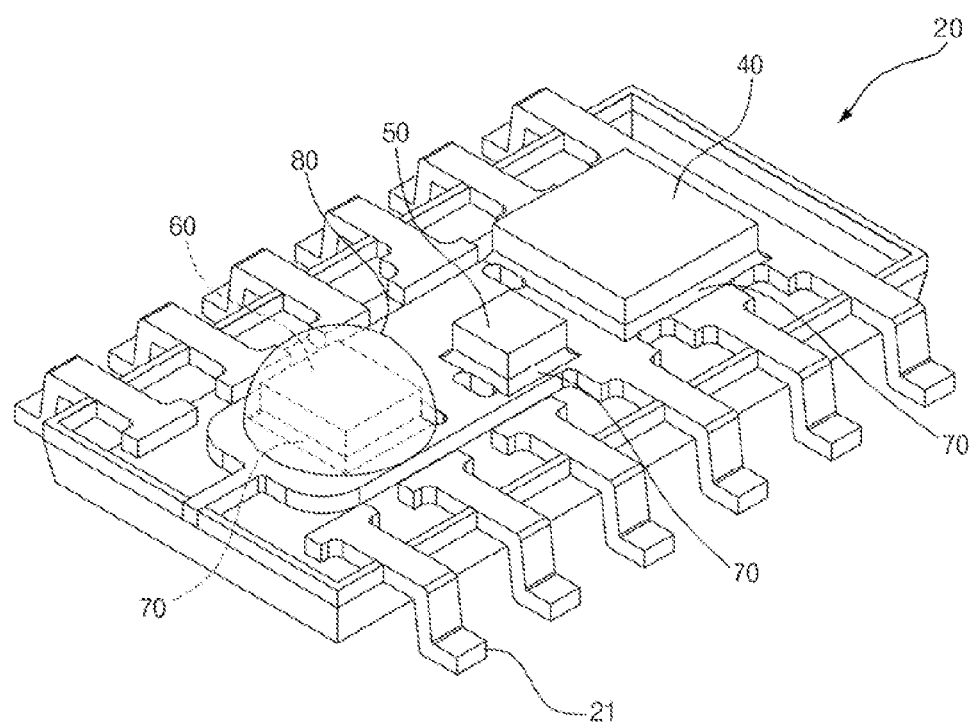
FIG. 3 is a perspective view showing the photo sensor package for lighting in a state in which it is mounted on a lead frame, according to the present invention.

FIG. 1 is a perspective view showing a photo sensor package for lighting according to the present invention, FIG. 2 is an exploded perspective view showing the photo sensor package for lighting according to the present invention, and FIG. 3 is a perspective view showing the photo sensor package for lighting in a state in which it is mounted on a lead frame, according to the present invention.

Referring to FIGS. 1 to 3, the photo sensor package for lighting according to the present invention includes a housing 10 which is molded using infrared transmissible resin, a lead frame 20 which comprises a conductor to input or output an electric signal, a remote control element 40 which receives an infrared signal, an amplification element 50 which amplifies an output signal from the remote control element 40, a micro control unit 60 which controls a lighting fixture 90 in response to a remote control signal received from the remote control element 40, and a shield case 30 which shields the remote control element 40, the amplification element 50, and the micro control unit 60 from noise and electromagnetic waves.

The housing 10 is molded using the infrared transmissible resin to protect the remote control element 40, the amplification element 50, and the micro control unit 60, which are mounted on the lead frame 20 therein. Here, the housing 10 includes a hemispherical lens 11 which is provided on the top of the housing 10 in such a way as to protrude upwards. The lens 11 guides a remote control signal, transmitted from a remote controller (not shown) or other remote infrared transmitting devices (not shown), to the remote control element 40.

The remote control element 40 receives a signal from the remote controller (not shown) or other remote infrared transmitting devices (not shown). In this regard, the remote control element 40 is mounted on the lead frame 20 in the housing 10, and is shielded by the shield case 30 that is located above the remote control element 40. Preferably, the remote control element 40 is positioned directly under the lens 11 of the housing 10.

The micro control unit 60 receives a remote signal applied from the remote control element 40 to control the lighting fixture 90. Preferably, the micro control unit 60 has a timer function to count a current time and thereby turn on or off the lighting fixture 90 if the current time reaches a preset time, and in addition, has a lighting control function to adjust the brightness of lighting. The timer function and the lighting control function may be established via a remote control for transmitting a remote control signal or other remote or wire short-distance control devices (not shown).

The micro control unit 60 is mounted on the lead frame 20 in such a way that an upper portion of the micro control unit 60 is shielded by the shield case 30. Moreover, disturbance-light shielding resin 80 is applied to the micro control unit 60 so as to prevent noise due to the infrared beams.

The disturbance-light shielding resin 80 is the resin that shields disturbance light incident from an outside, and is applied to an upper surface of the micro control unit 60. That is, as the micro control unit 60 and the remote control element 40 are mounted on the same lead frame 20 to form one package, the disturbance-light shielding resin 80 prevents disturbance light of a range in which an optical signal received from the remote control element 40 is included from being incident on the micro control unit 60.

The lead frame 20 has mounting parts (which are not denoted by a reference numeral) on which the remote control element 40, the micro control unit 60 and the amplification element 50 are mounted, with conductive paste 70 applied to the mounting parts (which is not denoted by a reference numeral). In this context, the respective mounting parts of the lead frame 20 are connected to or separated from a plurality of power terminals 21 extending to both sides of the lead frame 20. However, after the remote control element 40, the micro control unit 60, and the amplification element 50 are bonded to the mounting parts via the conductive paste 70, they are connected to the mounting parts via Au wires to allow an electric signal to be transmitted between terminals (which are not denoted by reference numeral) formed on the remote control element 40, the micro control unit 60 and the amplification element 50 and the power terminals 21 of the lead frame 20.

The shield case 30 is made of conductive metal to shield electromagnetic waves at a position above the lead frame 20, and its detailed configuration will be described with reference to FIGS. 2 to 4.

Figure 4:
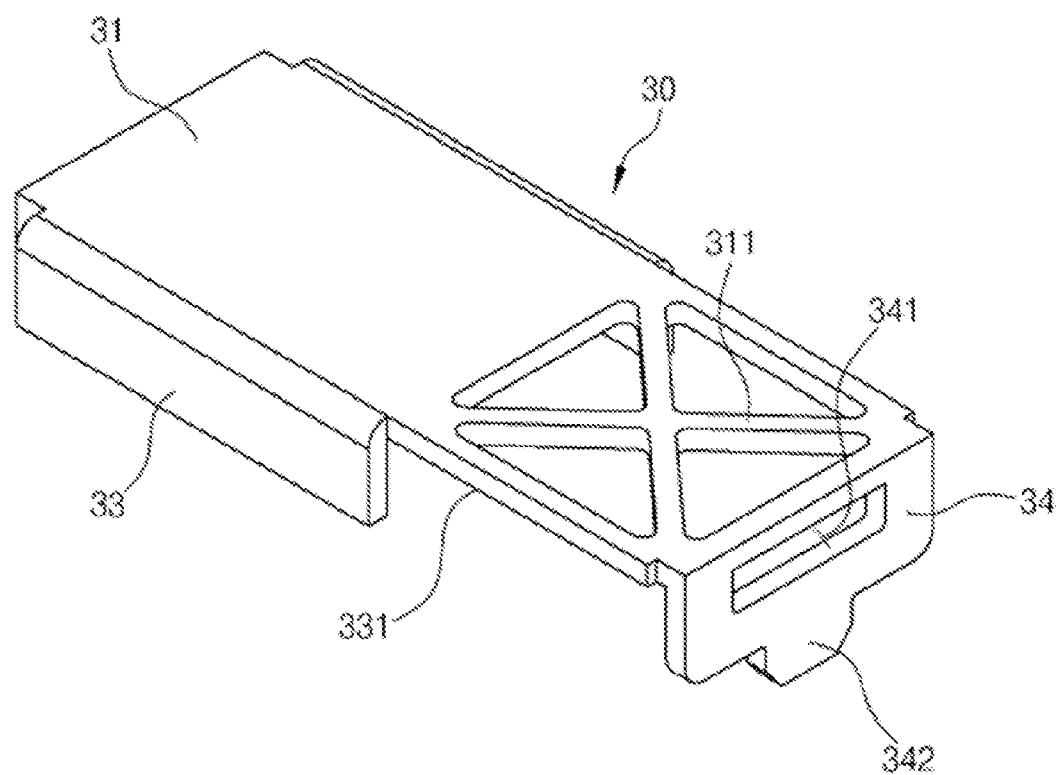
FIG. 4 is a perspective view showing a shield case in the photo sensor package for lighting according to the present invention.

FIG. 4 is a perspective view showing the shield case in the photo sensor package for lighting according to the present invention.

Referring to FIG. 4, the shield case 30 includes an upper plate that is in the form of a flat plane, a front plate 32 that extends perpendicularly from a front edge of the upper plate 31 to shield a front, side plates 33 that extend downwards from side edges of the upper plate 31 to shield sides, and a rear plate 34 that extends downwards from a rear edge of the upper plate 31 to shield a rear.

The upper plate 31 defines the upper surface of the shield case 30, and includes a shield window 311 that is formed above the remote control element 40 by placing one or more bars over an opening, the opening being formed at a position on the upper surface.

The shield window 311 is formed above the remote control element 40 to allow the infra-red signal to be transmitted to the remote control element 40 through the lens 11.

The front plate 32 extends downwards from the front edge of the upper plate 31 to shield the front. In this regard, the front plate 32 includes front protrusions which are provided on opposite sides of a cutout portion to be spaced apart from each other and protrude downwards, thus allowing the front plate 32 to be in close contact with and bonded to the lead frame via the conductive paste.

The front protrusions comprise a pair of front protrusions which are provided on the opposite sides of the cutout portion and extend downwards. The front protrusions are bonded via the conductive paste to the terminal of the lead frame or the upper portion of the lead frame. Here, the cutout portion increases a bonding area between the conductive paste and the front plate, thus enhancing bonding strength.

The side plates 33 extend downwards from both side edges of the upper plate 31 to shield the sides of the micro control unit 60 and the amplification element 50 mounted on the lead frame 20. In this regard, the side plates 33 include side guides 331 which are formed around the remote control element 40.

The side guides 331 are formed by cutting portions of the side plates 33 corresponding to the sides of the remote control element 40, thus allowing the infrared signal to be transmitted from the sides to the remote control element 40.

The rear plate 34 extends downwards from the rear edge of the upper plate 31 to shield the rear of the lead frame 20. Here, the rear plate 34 includes a rear guide 341 and a protruding plate 342. The rear guide 341 is formed by cutting a portion of the rear plate to allow the infrared signal to be transmitted to the remote control element 40. The protruding plate 342 extends to a lower portion of the lead frame 20 in such a way as to protrude downwards and is secured to the lead frame 20 via the conductive paste 70.

The rear guide 341 is formed by cutting the rear plate 34 to be located above the remote control element 40, thus guiding the infrared signal, transmitted from the rear, to the remote control element 40.

The protruding plate 342 protrudes downwards from an end of the rear plate 34. As the protruding plate 342 protrudes to extend downwards, it is bonded between the power terminals 21 of the lead frame 20 via the conductive paste 70.

The present invention embraces the above-mentioned configuration, and an operation of the photo sensor package for lighting according to the present invention will be described below in detail.

First, the process of manufacturing the photo sensor package is as follows: a worker applies the conductive paste 70 to the respective mounting parts formed on the lead frame 20, and bonds the micro control unit 60, the amplification element 50 and the remote control element 40 to each other.

Subsequently, this undergoes a given curing process to cure the conductive paste 70. Thereafter, the gold wires are connected between the micro control unit 60, the amplification element 50 and the remote control element 40 by soldering, thus enabling an electric signal to be transmitted between the components.

Next, the worker connects the power terminal, connected to the lighting fixture 90 among the plurality of power terminals 21 formed on the lead frame 20, to the terminal of the micro control unit 60 via the gold wires, thus allowing an electric signal to be transmitted between the components.

If the mounting process and the wire connecting process for the micro control unit 60, the amplification element 50 and the remote control element 40 have been completed, the worker applies the disturbance-light shielding resin 80 to the upper surface of the micro control unit 60 and then cures the disturbance-light shielding resin 80. However, no shielding resin is applied to the upper surfaces of the remote control element 40 and amplification element 50.

Next, the worker places the shield case 30 above the lead frame 20. Here, the shield case 30 is installed such that the shield window 311 is located directly above the remote control element 40, and the side guides 331 of the side plates 33 are located at both sides of the remote control element 40.

Subsequently, after the lead frame 20 and the shield case 30 are seated in a mold device (not shown), the infrared transmissible resin is injected therein, thus forming the housing 10. Here, the housing 10 includes the lens 11 that is located above the remote control element 40 to collect infrared beams.

The photo sensor package for lighting according to the present invention has been manufactured through the above-mentioned processes. Afterwards, a user operates the remote controller (not shown) which is configured to transmit a control signal to the remote control element 40 remotely, thus providing the timer function and the lighting control function to the micro control unit 60.

The timer function allows the user to manipulate a plurality of keypads included in the remote controller (not shown) and to automatically set an on/off time for the lighting fixture 90. Such a set signal of the remote controller (not shown) is output as the infrared signal, which is applied to the micro control unit 60 through the remote control element 40.

The remote control element 40 receives a setting signal transmitted through the remote controller (not shown) and then applies the signal to the amplification element 50. The amplification element 50 amplifies the setting signal transmitted from the remote control element 40 and then applies the amplified signal to the micro control unit 60. Thus, the micro control unit 60 stores the setting signal of the remote controller (not shown), counts the timer and applies a light-on signal or light-off signal to the lighting fixture 90 if the counted time reaches a preset time.

Further, the lighting control function is the function that automatically controls the lighting fixture 90 to adjust brightness by the micro control unit 60, in response to a brightness adjustment signal of the lighting fixture 90 or the brightness of the surroundings sensed by an illumination sensor (not shown).

Thus, the micro control unit 60 controls the brightness of the lighting fixture 90 if the brightness-adjustment signal of the illumination sensor (not shown) or the remote controller (not shown) has been received.

For example, if it becomes cloudy at noon and the illumination of the surroundings is lowered, the micro control unit 60 receives the brightness signal sensed by the illumination sensor (not shown) and turns on the lighting fixture to have brightness in conformity with a preset illumination reference. On the other hand, if the illumination of the surroundings is increased, the brightness of the lighting fixture 90 is lowered, thus preventing the unnecessary waste of energy.

As the housing 10 is molded with the infrared transmissible resin, the timer setting signal or the illumination setting signal, transmitted via infrared beams from the remote controller (not shown), are provided to the inside of the housing 10. However, since the micro control unit 60 is shielded by the disturbance-light shielding resin 80, disturbance light is not incident on the micro control unit 60 in response to the signal transmitted from the remote controller (not shown).

Therefore, the photo sensor package for lighting according to the present invention is configured to prevent the disturbance light incident on the remote control element 40 from being incident on the micro control unit 60 even though the remote control element 40 and the micro control unit 60 are integrated with each other, thus preventing noise and malfunction from occurring. That is, the present invention achieves the same reliability as a separate type micro control unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A photo sensor package for lighting, comprising:
a housing molded using infrared transmissible resin;
a remote control element configured to receive an infrared signal;
an amplification element configured to amplify a signal that is output from the remote control element; and
a micro control unit configured to control a lighting fixture in response to a signal that is output from the amplification element,
wherein all of the remote control element, the amplification element, and the micro control unit are mounted on one lead frame and accommodated in the housing in such a way as to be integrated into a single structure,
wherein the photo sensor package further comprises:
a shield case configured to shield an upper portion and opposite sides of each of the micro control unit, the amplification element and the remote control element,
wherein the shield case comprises:
an upper plate extending to shield the upper portion of each of the micro control unit, the amplification element and the remote control element;
a side plate extending downwards from each of opposite side edges of the upper plate; and
a rear plate extending downwards from the upper plate to shield a rear of the remote control element,
wherein the rear plate comprises a rear guide formed by cutting a predetermined portion of the rear plate to guide an infrared beam, which is incident through the housing, to the remote control element, and a protruding plate extending downwards from a lower end of the rear guide and bonded to the lead frame via conductive paste,
the side plate comprises a side guide formed by cutting a portion of the side plate, corresponding to each of the opposite sides of the remote control element, thus allowing the infrared beam to be incident on the remote control element, and
the upper plate comprises a shield window formed directly above the remote control element.

2. The photo sensor package as set forth in claim 1, further comprising:
disturbance-light shielding resin applied to an upper surface of the micro control unit to shield disturbance light.

3. The photo sensor package as set forth in claim 1, wherein the shield case further comprises a front plate extending downwards from a front edge of the upper plate to shield a front, and
the front plate comprises a cutout portion formed by cutting the front plate to define a space, and front protrusions provided on opposite sides of the cutout portion in such a way as to protrude downwards.

4. The photo sensor package as set forth in claim 1, wherein the micro control unit sets a time to turn on or off the lighting fixture, and controls the lighting fixture if a counted time reaches a preset time.

5. The photo sensor package as set forth in claim 1, wherein the micro control unit is configured to control brightness of the lighting fixture.

* * * * *